United States Patent Office 3,520,731
Patented July 14, 1970

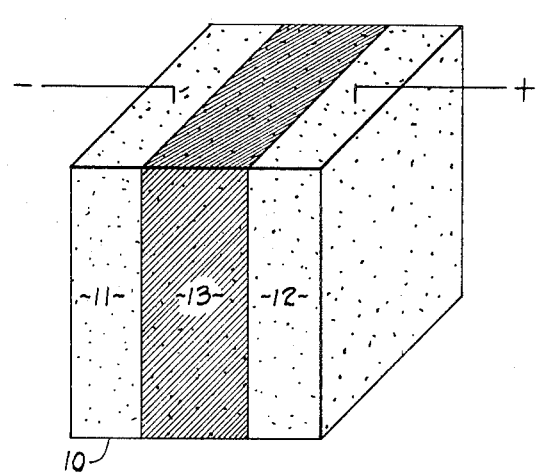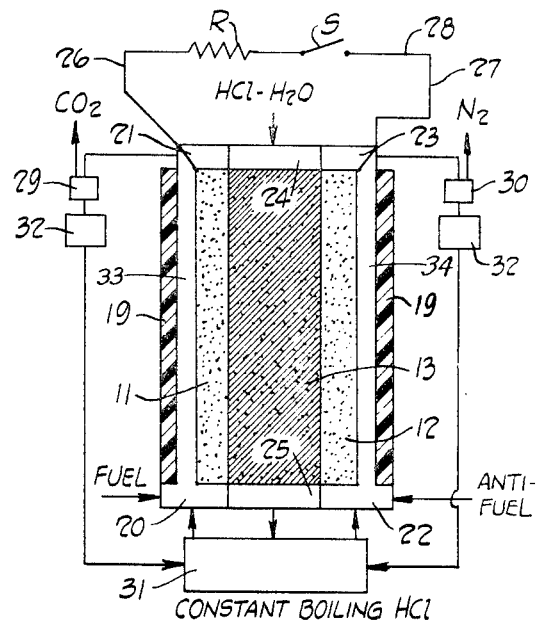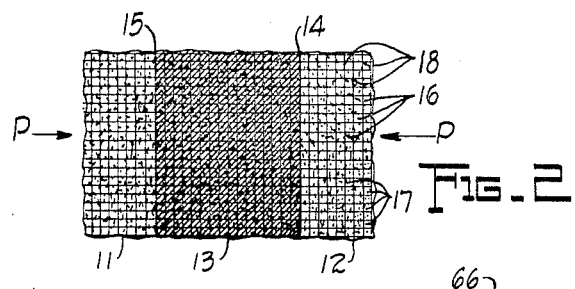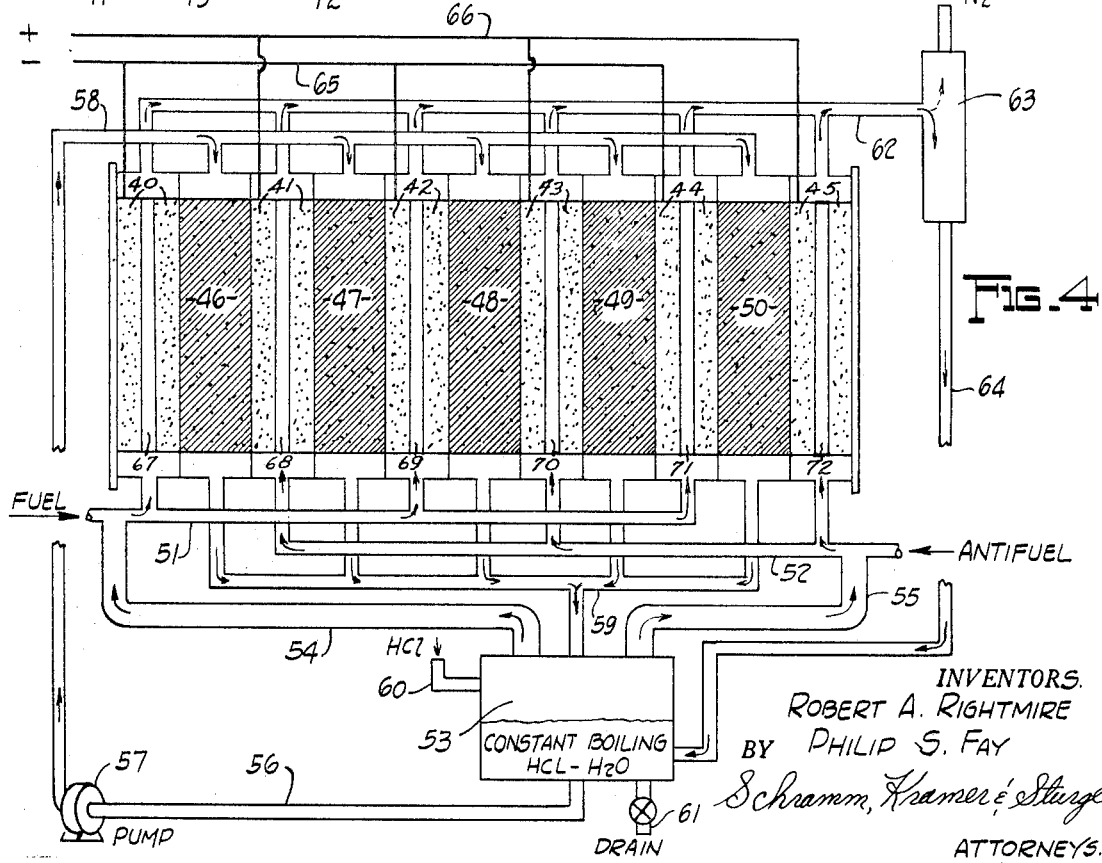

3,520,731
ELECTROCHEMICAL REACTION APPARATUS
Robert A. Rightmire, Northfield, and Philip S. Fay, Cleveland, Ohio, assignors to The Standard Oil Company, Cleveland, Ohio, a corporation of Ohio
Continuation-in-part of application Ser. No. 79,691, Dec. 30, 1960. This application Jan. 5, 1966, Ser. No. 528,681
Int. Cl. H01m 27/00
U.S. Cl. 136—86        14 Claims

ABSTRACT OF THE DISCLOSURE

Electrochemical apparatus and process comprising a matrix of a central section having pores less than about 2 micron size and bounded by adjacent electrodes contacting the central section on opposite sides and having pores of from 1 millimicron to 20 microns and accompanying facilities for producing electrical energy continuously.

---

This application is a continuation-in-part of copending application Ser. No. 79,691, filed Dec. 30, 1960 now abandoned.

This invention relates generally to the direct conversion of one form of energy to another, and more particularly relates to an improved arrangement for accomplishing such direct conversion electrochemically. The principles of the invention, for exemplary purposes, will be described in reference to a fuel cell for directly converting chemical energy into electrical energy, it being understood, that these principles are applicable to other types of electrochemical reaction apparatus as well.

The direct conversion of chemical energy into electrical energy may be accomplished by causing chemical reactions to take place between reactive materials at the junctures between spaced electron conductors, and an intermediate ion-containing and conducting medium to form a continuous energy exchange system. The reactive materials are separately supplied to each juncture so that the charge exchange of the reaction takes place ionically through the ion conductor forming an internal circuit and electrically through the electron conductor forming an external circuit. Thus, where the reactive materials are continuously supplied and an electrical load coupled to the external circuit, it is possible to electrochemically convert the energy of chemical reaction directly into electrical energy in the external circuit.

By way of example, where hydrogen is employed as one of the materials and oxygen as the other, the oxidation and reduction of these materials at the corresponding juncture between the electronic and ionic conductors generates electrical energy in the external circuit and produces water as a product of the reaction. When each of the materials is continuously supplied and consumed within such apparatus, they may be likened, respectively, to a fuel and an antifuel, the former of which is selected to yield electrons in its chemical reaction and the latter of which is selected to accept electrons.

Normally, in any such apparatus, the fuel and antifuel are supplied in a relatively stable condition and some means is required for activating their conversion from their normally stable reactant state to their reaction product state. It is believed that such conversion of the fuel and antifuel takes place by means of chemical adsorption to a chemisorbed state and desorption to their reaction product state at the corresponding junctures between the electron and ion-conductors. Such conversion of the fuel and antifuel is not practically self-motivating and is, therefore, preferably enhanced by the introduction of some means which will promote adsorption and desorption at each juncture. The reaction products may be removed from the apparatus in any convenient manner and preferably as they are formed.

For the exemplary purpose of this description, the apparatus for accomplishing the direct conversion of chemical energy to electrical energy will be identified as a fuel cell. The electron conductors will be identified as electrodes and more specifically as the anode and cathode, respectively, depending upon whether they are on the fuel or antifuel side of the cell. The fuel will be identified throughout as any substance which is oxidizable relative to the antifuel which will in turn be identified as any substance which is reducible relatively to the fuel; where oxidation and reduction, respectively, contemplate the release and acceptance of electrons.

A medium which is capable of conducting an electrical charge associated with an atom or a group of atoms, i.e., ions, will be referred to as an ion-containing and conducting medium. This medium serves to isolate the electronic conductors from each other in the internal circuit. The junctures between the electrodes and the ion-containing and conducting medium will be identified throughout as interfaces. The activating means for promoting the conversion of the fuel and the antifuel from the reactant state through the chemisorbed state to the reaction product state may, where necessary, be more specifically identified in conjunction with the functional coaction in the cell as an adsorber and a desorber. This overall reaction will be referred to as an electrochemical reaction.

Briefly stated, the present invention is more particularly concerned with the improvements in the structural components of such electrochemical energy conversion apparatus, and contemplates a substantially rigid multiporous reticulated matrix of particles each having micro-size pores and compacted to provide macro-size pores therebetween. Means are provided in opposed spaced marginal boundaries of the matrix to render the boundary portions electronically conductive. Ion-containing and conducting means are provided in the micro-size pores and macro-size pores of the matrix. When electrochemically coacting reactants (e.g., hydrogen and oxygen) are selectively supplied to only certain pores, as hereinafter explained, of each of the aforesaid marginal boundary portions, respectively, an electrical potential is established between the electronically conductive marginal boundary portions which is capable of doing useful work. The products of the electrochemical reaction may be exhausted from the apparatus in a continuous manner, and hence a very compact generator of electrical energy without moving parts is provided. Among the advantages of electrochemical reaction apparatus of the type briefly described above and more particularly described hereinafter, are the provision of increased electrochemical reaction sites per unit of volume thereby enabling a high conversion rate for the electrochemical reactant materials. Electrochemical reaction apparatus produced in accordance herewith also is characterized by high thermal efficiency at high power densities. These devices can operate for extended periods without running down or experiencing corrosion of materials. The device is further characterized by operational simplicity.

In more particular embodiments of the devices of the present invention, control means are also provided for improving the efficiency of the electrochemical reaction. The simple construction of the device of the present invention, and particularly the ability to be embodied in laminar form, enables these devices to be multiplied in various ways to provide a large number of units per unit of volume.

In the annexed drawings:
FIG. 1 is a diagrammatic illustration of an electrochemical reaction unit embodying the principles of the present invention.

FIG. 2 is an enlarged diagrammatic representation of a section of the electrochemical reaction unit shown in FIG. 1.

FIG. 3 is a diagrammatic and schematic illustration of an electrochemical reaction apparatus in accordance herewith equipped for a continuous production and utilization of electrical energy.

FIG. 4 illustrates a stacked assembly of electrochemical reaction units in accordance herewith.

Referring more particularly to FIG. 1 and FIG. 2, there is here illustrated in diagrammatic form an electrochemical reaction apparatus unit composed of a substantially rigid multiporous reticulated matrix generally indicated at 10. The matrix 10 is characterized by three distinct sections 11, 12 and 13. Sections 11 and 12 are spaced apart, and suitable means are provided in marginal boundary portions 11 and 12 to render these portions electronically conductive, as by depositing a metallic electron conductor such as gold on the surfaces of the particles from which the reticulated matrix is made as hereinafter more particularly described. The intermediate portion 13 is rendered ion conductive by flooding this section with a suitable ion-containing and conducting medium.

The reticulated matrix 10 is conveniently formed of particles of aluminum oxide, which are electrically nonconductive and which have been compacted together under pressure to provide a substantially rigid body. One of the characteristics of alumina particles is that they contain micro-size pores therethrough. When individual particles containing these pores and having a particle size in the range of from 50 to 250 mesh are compacted together under pressure, macro-size pores remain between the individual particles. There thus results a substantially rigid multi-porous reticulated matrix of particles each having micro-sized pores, compacted to provide macro-size pores therebetween. This is diagrammatically illustrated in FIG. 2. The small squares 16 represent the particles of aluminum oxide, and the dots 17 represent the micro-size pores within the particles 16. The particles 16 being assumed to have a substantially spherical shape when compacted to provide macropores between adjacent particles which are diagrammatically represented by the inner section of the lines outlining the particles 16 as shown at 18.

The marginal portions 11 and 12 of the reticulated matrix 10 are rendered electronically conductive, as indicated above, by depositing on the surface of the corresponding particles 16, a metal, such as gold. This may be accomplished by filling the macropores in the marginal portions 11 and 12 with a gold chloride solution and chemically reducing the gold ions to metallic gold for deposition on the surface of the compacted particles. The aqueous medium is then removed from the macro-size pores. Pressure regulation imposed upon the exposed surfaces of the compressed reticulated matrix may be employed to prevent the gold containing solution from saturating the entire matrix 10 by capillary attraction in the macro-size pores. Thus, both marginal portions 11 and 12 may be rendered electrically conductive in this manner.

The central section 13 is cross-hatched in FIG. 2 to illustrate the presence therein under operating conditions of an aqueous ion-containing and conducting medium which initially completely floods the macropores 18 and the micro-size pores 17.

When electrochemical reactant is supplied to the marginal boundary region, it is supplied with sufficient pressure to blow the ion-containing and conducting medium out of the micro-size pores and the macro-size pores exceeding about 2 microns in diameter. There is, therefore, throughout the entire matrix a continuous ion-containing and conducting medium system in the micro-size pores and the macro-size pores of less than about 2 microns. A large proportion of the pores in excess of about 2 microns diameter are found in the marginal boundary regions.

Boundary lines 14 and 15 diagrammatically illustrate the boundaries of the ion-containing and conducting medium which is confined to the pores less than about 2 microns diameter by regulation of the pressure exerted on the electrochemical reactant materials, respectively, as indicated by the arrows in FIG. 2. Such pressure regulation is in proportion to the bubble pressure for the pore size. The bubble pressure for pore sizes ranging from 1 to 100 millimicrons is 422 p.s.i.g.; for 0.5 to 2 microns, 21 p.s.i.g.; and for 10 to 20 microns, 2.1 p.s.i.g. Bubble pressure is the gas pressure which is equal and opposite to capillary pressure of a liquid. A suitable pressure for fuel and antifuel, respectively, is within the range of from 3 to 20 p.s.i.g.

The pores of the central region 13 of FIG. 1 are no larger than about 2 microns size. Thus, it is noted that in the central portion, because of the limited pore size, gas pressures of 21 pounds per square inch, or more, are needed to force ion-containing and conducting medium from the central portion. It is also to be noted that in the marginal portions 11 and 12, the pores are from about 0.5 to 20 microns size, a large proportion of which pores are in the range of about 20 microns size, and hence, have a bubble pressure of less than about 21 pounds per square inch, and more particularly, a pressure of about 2.1 pounds per square inch. Therefore it is seen that gas pressures of the chemical reactants (fuel and antifuel) of between about 2.1 and 21 pounds per square inch are sufficient to force the ion-containing and conducting medium from the pores of the marginal portions 11 and 12, but are not sufficient to force the ion-containing and conducting medium from the pores of the central portion 13. In a word, the intermediate portion is resistant to pressure breakthrough because of the absence of pores larger than about 2 microns size.

Pores of larger than say about 2 microns serve as a conduit to allow electrolyte to enter the smaller pores of less than, say, about 2 microns, which comprise about 90 percent of the matrix. Once the pores of less than about 2 microns are saturated with the ion-containing and conducting medium, the most important function of the pores of greater than about 2 microns size is fulfilled. When pressure, by means of the electrochemical reactants, is applied to the marginal zones, the electrolyte filling the pores of larger than about 2 microns is displaced, the electrochemical reactants, by means of the pores larger than about 2 microns size, which serve as a conduit, have free access to the pores of less than about 2 microns size, in which the electrochemical reaction between the fuel and antifuel occurs. Once electrochemical reaction occurs, the gaseous reaction product can be discharged through the pores larger than about 2 microns size, which serve as a conduit, as aforementioned, to the exhaust manifold. Thus, the large pores function on a reduced scale, similar to the input and exhaust manifolds of the fuel cell herein described. Also, the intermediate portion acts as a reservoir of ion-containing and conducting medium to provide a continuous supply of ion-containing and conducting medium to the marginal boundary regions or electrode area.

As indicated above, gold deposited on the surface of the individual particles 16 in boundary portions 11 and 12 provide the electrodes or electron conducting members of the electrochemical reaction apparatus. It should be understood that other metals such as nickel, platinum, silver, palladium, niobium, etc., may be used to replace gold in either one or both of the boundary portions 11 and 12. When operating the electrochemical reaction apparatus of FIGS. 1 and 2 as a fuel cell, and continuously supplying a fuel to the boundary portion 11 and an antifuel to the boundary portion 12, it is frequently desirable to select as the metalizing agents for the portions 11 and 12, respectively, metals to which the electrochemical reaction materials become preferentially adsorbed. For example, where the fuel is hydrogen, adsorption on palladium is particularly good. Where the antifuel is oxygen, adsorption on silver is particularly good. Where the fuel is a hydrocarbon, such as ethane, gold may be used as well as platinum or palladium. The latter is capable of exerting a catalytic dehydrogenation upon the hydrocarbon fuel. Thus, the metals which are selected for the electrode members 11 and 12 may be selected with reference to their ability to activate adsorption of the electrochemical reactant materials, respectively, for further electrochemical reaction. Instead of metal, we may use porous activated carbon lamina having macropores averaging 15 microns and micropores averaging 50 millimicrons in size, as the fuel electrode 11 (FIG. 3) and antifuel electrode 12 (FIG. 3) respectively. The intermediate section 13 (FIG. 3) may be of porous alumina having pores averaging 1.25 microns. A pressure for the fuel and antifuel, respectively, is conveniently 15 p.s.i.g. Upon flooding the central section 13 with 20 percent HCl-water solution and for the pore sizes involved, this pressure will not force the ion-containing medium from the cell, or permit electrode flooding.

The pressure of the incoming ion-containing and conducting medium is not sufficient to force the ion-containing and conducting medium out of the intermediate portion into the marginal boundary region, since the ion-containing and conducting medium is at all times in pressure equilibrium with the electrochemical reactants at the interface between the intermediate portion and the opposed marginal regions. Conversely, since it is possible to maintain the phases in equilibrium, there is, likewise no flooding of the intermediate portion by the electrochemical reactants. However, there is a pressure drop between the incoming ion-containing and conducting medium entering at the uppermost area of the intermediate portion and the exiting ion-containing and conducting medium at the lowermost area of the intedmediate portion. Therefore, the ion-containing and conducting medium and any electrochemical reaction products are discharged therefrom.

It is also contemplated by the present invention to provide within the micro-size pores 17 of the particles 16 activators for desorption of the chemisorbed electrochemical reactant materials to the reaction product state with the attendant release and acceptance of electrons to and from the external circuit, respectively. These activators for desorption may be catalytically selected to enhance the rate of desorption and improve the energy exchange during each step of the reaction. The rate of reaction may be accelerated by selecting a polyvalent state for the activator ion which is greater than the reactant valence state of the corresponding fuel or antifuel. It is also possible to control the exchange of free energies between the reacting components by predetermined matching of the standard electrode potentials of the activators to the standard electrode potentials of the fuel and antifuel respectively. Such matching minimizes the loss of energy that might otherwise occur in an unbalanced or unmatched system. Efficiency of operation of the electrochemical reaction apparatus may be further improved by selection of respective activator components to have common anionic portions, such as chloride.

Pursuant to these control methods, then, a suitable activator for desorption of hydrogen derived from the fuel is stannous chloride, the stannous ion having a valence state higher than that of hydrogen, and further being oxdized from the divalent to the tetra-valent state at an electrode potential which is substantially the same as that for hydrogen derived from a hydrocarbon fuel, i.e., 0.17 volt. Likewise, on the antifuel side of a fuel cell in accordance herewith, there may be deposited in the micro-size pores 17 an activator for desorption of ions derived from the antifuel, such as, hydroxyl ions derived from oxygen in the air in the presence of the aqueous medium thallium chloride. In addition to existing in a valence state (+3) which is in excess of the valence state of the material derived from the antifuel (hydroxyl ion) thallium in changing from a valence of +1 to a valence of +3 exhibits a standard electrode potential of about 1.22 volts which is in excellent potential match for a standard electrode potential of oxygen.

In the preferred embodiments shown, moisture must be present in the micro-size pores and the macro-size pores of the marginal boundary portions 11 and 12 to provide the necessary operating environment. Where the principal reactants are hydrogen and oxygen as indicated above, the reaction product of the cell is water which must, of course, be continuously removed. This can be accomplished by any conventional arrangement such as evaporation, and removal of moisture via the exhaust gases.

In order to provide ion-containing and conducting medium in the micro-size pores and at the surfaces forming reactive interfaces on the particles which are coated with an electron conducting metal, moisture is conveniently provided from a constant boiling aqueous hydrochloric acid solution boiling at about 110° C. at 760 mm. Hg and containing water and HCl in a ratio by weight of about 4:1. Vapors from such aqueous hydrogen chloride solution are passed at the same pressure and concurrently with the fuel and antifuel through the macro pores of the marginal boundaries 11 and 12, respectively, thereby providing the requisite moisture for the proper functioning of the activator materials in the respective boundary portions. Other well known constant boiling solutions of inorganic acids, e.g., hydrobromic, hydroiodic, nitric, etc., may also be used.

An apparatus for carrying out the steps outlined above is diagrammatically shown in FIG. 3. There is here shown a single fuel cell unit of the type shown in FIGS. 1 and 2, having electrode portions 11 and 12 and intermediate portion 13 formed from a substantially rigid duo-porous reticulated matrix of particles as previously described. The cell unit is suitably enclosed in a nonconducting e.g., poly(methylmethacrylate) plastic housing 19. The fuel electrode portion 11 is conveniently provided with an intake manifold 20, a header 33 and an exhaust manifold 21. In like manner, the intermediate section 13 is provided with a suitable inlet header 24 and a suitable outlet collector 25. Headers 33 and 34 supply the fuel and antifuel, respectively, to the faces of electrodes 11 and 12 at uniform pressure along the electrode surface which is substantially parallel to the interface between the marginal portions 11 and 12 and the intermediate portion 13. The electron conducting leads 26 and 27 lead from the fuel electrode 11 and the antifuel electrode 12, respectively, and may be connected as shown to an external circuit 28 schematically represented by a load R and a switch S. Inlet header 24 is isolated from manifolds 21 and 23 by impermeable walls; collector 25 is isolated from manifolds 20 and 22 by impermeable walls.

The auxiliary equipment diagrammatically illustrated shows a source of constant boiling hydrochloric acid solution which is vaporized by any suitable means, not forming part of this invention and therefore not shown, and the vapor is admixed, respectively, with the fuel in the intake manifold 20 and the antifuel in the intake manifold 22. In the fuel electrode portion 11, the conduct of the electrochemical reaction yields hydrogen ions which in combination with the hydroxyl ions derived from the antifuel produces water as a by-product of the cell, and carbon dioxide as a by-product of the fuel electrode electrochemical reaction. The carbon dioxide is exhausted along with the constantly recirculated vaporized hydrochloric acid-water solution. The exhaust vapors from the electrode portion 11 are condensed, the carbon dioxide vented to the atmosphere and the condensate from the condenser 29 adjusted in concentration of HCl either by evaporation or by addition of concentrated HCl and returned to the boiler 31. On the antifuel side, the vapors from the boiler 31 are admixed with the antifuel in the intake manifold 22 and passed through the macro-pores of the antifuel electrode member 12. The by-products of the electrochemical reaction which include water and nitrogen are removed from the cell through the outlet manifolds 25, 21 and 23 which are maintained at substantially atmospheric pressure, condensed in the condenser 30, the nitrogen gas being vented to the atmosphere, and the concentration of the recycle stock adjusted either by the addition of HCl or by removal of water as by evaporation in the concentrator 32. The recycle material is then returned to the boiler 31 for recycling through the system. Aqueous hydrochloric acid solution may be added from the inlet manifold 24 to the intermediate section 13, and collected in the collecting manifold 25 and returned to the constant boiling HCl boiler 31 or separately handled as a liquid for recycling through the intermediate section.

FIG. 4 shows an embodiment of the principles of the present invention in an integral assembly of electrochemical reaction units which share common electrodes exposed to a common supply of the corresponding reactant. Thus, alternate electrodes are exposed to a relatively reducible reactant, and intermediate electrodes are exposed to a relatively oxidizable reactant to provide electrodes of alternating polarity across the assembly. With such an arrangement, the corresponding reactants can be supplied from suitably manifolded ducts and the overall assembly constructed in integral compact arrangement with a minimum of external ducts or connections.

Referring more particularly to FIG. 4 of the drawings, there is diagrammatically shown an electrochemical reaction apparatus in the exemplary form of a multiple fuel cell having a plurality of electrodes 40, 41, 42, 43, 44 and 45 disposed in juxtaposed spaced relation to each other, and provided with gas passages 67, 68, 69, 70, 71 and 72 for supplying fuel and antifuel to the respective marginal portions. The spaces between the electrodes are occupied by intermediate portions 46, 47, 48, 49 and 50, respectively, for coaction in the manner hereinbefore described. Thus, the electrodes 40 and 41 in combination with the intermediate portion 46 constitute a fuel cell unit of the same physical structure and formed in the same manner as the device shown in FIGS. 1 and 2. The apparatus is also arranged in substantially the same manner as shown in FIG. 3 with the exception that the manifolding and feeding means are adapted to a multiple unit assembly as distinct from the single unit assembly shown in FIG. 3.

The mode of operation is, however, essentially the same. Gaseous fuel is introduced into the fuel electrodes 40, 42 and 44 through a suitable manifold 51, and passages 68, 70 and 72. The pressure of the gaseous fuel and antifuel is at least in the bubble pressure range for the particular macro-pore size of the matrix portion involved, and sufficient to maintain the gaseous reactants in contact with the electron conducting portions and the ion-containing and conducting medium within the intermediate portion. The electrodes 40 and 45 inclusive contain activators potentially matched to the fuel and antifuel, respectively, in the pores of the porous aluminum oxide reticulated matrix. Moisture is supplied to each of these by co-mingling the vapors of a constant boiling HCl-water solution with the fuel and antifuel, respectively, and at the same pressure. Thus, there is provided a boiler 53 with suitable ducts 54 and 55 leading to the fuel manifold 51 and the antifuel manifold 52, respectively, to supply the necessary moisture to the electrodes. The constant boiling solution may be withdrawn from the boiler 53 as a liquid through conduit 56 and pumped by means of a pump 57 to a suitable manifold 58 communicating with the intermediate portions 46, 47, 48, 49 and 50 to continuously supply ion-containing and conducting medium in liquid form to such intermediate portions. This material is constantly recirculated through the intermediate portions and back ot the boiler through a suitable exit manifold 59. The concentration of the HCl, approximately 6 normal, is maintained by the addition of concentrated HCl to the boiler through a suitable inlet 60. Since some water of electrochemical reaction may accumulate in the ion-containing and conducting medium, it is necessary from time to time to withdraw HCl-water solution through a suitable drain 61.

The exhaust gases from each of the electrode members 40 to 45 inclusive are collected in a suitable exhaust manifold 62 at atmospheric pressure and passed through a water cooled condenser 63 where the gaseous exhaust products carbon dioxide and nitrogen are vented to the air, and the condensate is returned to the boiler 53 through the return line 64. Suitable lead lines 65, and 66 lead to the fuel electrodes 40, 42 and 44, and to the antifuel electrodes 41, 43 and 45, respectively, from which the electrical output of the cell is taken. The fuel and antifuel are fed to the cell under sufficient pressure to maintain the liquid ion-containing and conducting medium in the intermediate portions 46, 47, 48, 49 and 50 confined to a relatively narrow band.

The electrode portions 40, 41, 42, 43, 44 and 45 may be made of separate compacted particulate alumina compacted to form the reticulated matrix, and subsequently coated with a metal as previously indicated. The intermediate portions may also be made of the same material of the same or different particle size without, however, undergoing the metallizing step. The several units thus prepared may then be laminated in the manner indicated in FIG. 4. The alumina which we prefer to use in constructing the electrochemical apparatus units of the present invention is conveniently a gamma-alumina which has been activated by washing with hydrochloric acid. A convenient particle size is 100 mesh. The particles are compacted in a suitable mold, and the compacted mass sintered to form the respective electrode members and the intermediate portions. As indicated above, the electrode portions and the intermediate portions may be a single block of alumina with the marginal portions thereof treated as indicated previously to provide electron conducting means in such marginal portions. Alternatively, lamina of metallized alumina in combination with an unmetallized intermediate section, or lamina of porous activated carbon in combination with an alumina intermediate section may be used to provide the fuel cell units hereof. Such lamina may have the same or different average macro-pore size.

A further alternative contemplate forming a unitary matrix by compressing lamina of different particle sizes to form marginal boundary portions having relatively large macropores (from larger particles) and hence a low bubble pressure, and intermediate portion of relatively smaller macropores (from smaller particles) having a higher bubble pressure. Then, pressures in excess of the bubble pressures for the boundary portions, but below the bubble pressure for the intermediate portion can be employed to maintain a gas phase in the pores of marginal portions and a liquid phase in the pores of the intermediate portion.

Thus, there has been provided an improved electrochemical reaction apparatus characterized by a substantially rigid duo-porous reticulated matrix of particles each having micro-size pores compacted to provide macro-size pores therebetween. The macro-size pores provide a large surface area for the solid phase of the electrochemical reaction and a means for passing large quantities of electrochemical reactant materials therethrough. The micro-size pores provide a proximate source of supply of the liquid phase and a relatively large volume thereof. Thus by increasing the reactive sites within the electrode member, it is possible to improve the efficiency of operation of the solid-liquid-gas phase electrochemical reaction occurring within the apparatus. In combination with the control means which are available, highly efficient primary cells can be produced, and because these cells can be made in extremely thin sections, they may be laminated to provide a large number of cell units per unit of volume.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. In an electrochemical reaction apparatus, a multiporous reticulated matrix of particles compacted to provide macro-size pores therebetween and each particle having micro-size pores, the matrix comprising a unitary mass of a nonconducting intermeditate portion of pores less than about two microns size bounded by first and second adjacent, marginal regions, opposing one another on opposite sides of the intermediate portion and contacting the intermediate portion, the pores of which range from about 0.5 to about 20 microns size a large proportion being about 20 microns, the marginal regions being electrically conductive, the pores of the matrix of less than about 2 microns size containing liquid ion-containing and conducting medium, the pores of the matrix in excess of about 2 microns size containing substantially gaseous electrochemical reactants of fuel and antifuel, respectively, the gaseous electrochemical reactants and the ion-containing and conducting medium forming an interface with respect to the macropores, means for continuously supplying the ion-containing and conducting medium to the pores of the matrix of the intermediate portion, means for continuously supplying the fuel and antifuel to the first and second opposed marginal regions, respectively.

2. The electrochemical reaction apparatus of claim 1 wherein the gaseous electrochemical reactants and the liquid ion-containing and conducting medium form a gas-liquid interface with respect to the macropores substantially coincident with the boundary zone between the opposed marginal regions and the intermediate portion.

3. An electrochemical reaction apparatus in accordance with claim 1 in which the ion-containing and conducting medium is an aqueous-acidic constant boiling solution.

4. An electrochemical reaction apparatus in accordance with claim 3 in which the aqueous-acidic boiling solution is aqueous-hydrochloric acid.

5. An electrochemical reaction apparatus in accordance with claim 4 containing means for recycling the ion-containing and conducting medium for continuous supply.

6. An electrochemical reaction apparatus in accordance with claim 5, the opposed adjacent marginal regions being a pair of spaced opposed porous carbon electrodes each comprising a multiporous reticulated matrix of carbon particles, each having a micro-size pores and compacted to provide macro-size pores therebetween.

7. An electrochemical reaction apparatus in accordance with claim 5 wherein the means for recycling said ion-containing and conducting medium includes means for adjusting the concentration of ions therein.

8. In an electrochemical reaction apparatus, a porous matrix of microporous particles compacted to provide macropores therebetween, the matrix consisting essentially of a nonconductive central section of pore size less than about 2 microns, bounded by first and second adjacent marginal conductive regions opposite one another on opposite sides of the central section and contacting the central section, the pores of the marginal regions ranging in size from about 0.5 to about 20 microns a large proportion being about 20 microns, inlet means for continuously supplying ion-containing and conducting medium to the matrix, inlet means for supplying fuel and antifuel reactants to the first and second marginal opposed regions respectively, and exhaust means for discharging waste reaction products and excess ion-containing and conducting medium.

9. The apparatus of claim 8 wherein there is present recycling means for the ion-containing and conducting medium.

10. The apparatus of claim 9 wherein the opposed adjacent marginal regions are a pair of porous carbon electrodes, each having micro-size pores and compacted to provide macro-size pores therebetween.

11. In the method for generating electric current in which microporous particles are compacted to form a nonconducting central section of pores less than about 2 microns bounded by first and second marginal conductive regions of pores from 0.5 to 20 microns, a large proportion being about 20 microns, said marginal conductive regions laminated on opposite sides of the central section, the pores less than about 2 microns containing liquid ion-containing and conducting medium, passing a reducing gas in contact with the first marginal area with a pressure sufficient to maintain a gas-liquid interface in the macropores of the first marginal area, passing an oxidizing gas in contact with the second marginal area sufficient to maintain a gas-liquid interface in the macropores of the second marginal area, supplying liquid ion-containing and conducting medium to the central portion, supplying water vapor and gaseous ion-containing and conducting medium to the first and second marginal regions and exiting waste product and excess ion-containing and conducting medium from the central section.

12. The method of claim 11 wherein the gas-liquid interface of the macropores is substantially coincident with the physical boundary between the first and second marginal areas and the central portion.

13. The method of claim 12 wherein the ion-containing and conducting medium is an aqueous-acidic constant boiling solution.

14. The method of claim 13 wherein the aqueous-acidic boiling solution is aqueous-hydrochloric acid.

References Cited

UNITED STATES PATENTS

| | | | |
|---|---|---|---|
| 2,276,188 | 3/1942 | Greger | 136—86 |
| 2,947,797 | 8/1960 | Justi et al. | 136—86 |

WINSTON A. DOUGLAS, Primary Examiner

H. A. FEELEY, Assistant Examiner